United States Patent
Zhang

(10) Patent No.: US 8,721,156 B2
(45) Date of Patent: May 13, 2014

(54) BACKLIGHT MODULE AND BACKPLATE OF THE BACKLIGHT MODULE

(75) Inventor: Tian Zhang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 51 days.

(21) Appl. No.: 13/260,375

(22) PCT Filed: May 6, 2011

(86) PCT No.: PCT/CN2011/073788
§ 371 (c)(1),
(2), (4) Date: Sep. 25, 2011

(87) PCT Pub. No.: WO2012/119345
PCT Pub. Date: Sep. 13, 2012

(65) Prior Publication Data
US 2012/0224394 A1   Sep. 6, 2012

(51) Int. Cl.
*G02B 6/42* (2006.01)
*F21V 8/00* (2006.01)

(52) U.S. Cl.
USPC .......................................... 362/632; 362/581

(58) Field of Classification Search
USPC .................... 362/623–634; 349/58, 59–60
See application file for complete search history.

(56) References Cited

U.S. PATENT DOCUMENTS

| | | | | |
|---|---|---|---|---|
| 6,609,808 B2 * | 8/2003 | Chen | | 362/632 |
| 6,856,363 B2 * | 2/2005 | Kim | | 349/65 |
| 6,954,238 B2 * | 10/2005 | Liu et al. | | 349/65 |
| 7,086,775 B2 * | 8/2006 | Huang et al. | | 362/652 |
| 7,116,386 B2 * | 10/2006 | Lee et al. | | 349/58 |
| 7,215,389 B2 * | 5/2007 | Shida | | 349/58 |
| 7,333,163 B2 * | 2/2008 | Huang et al. | | 349/58 |
| 7,543,976 B2 * | 6/2009 | Abogabir | | 362/633 |
| 8,072,557 B2 * | 12/2011 | Kim et al. | | 349/58 |
| 2007/0285948 A1 * | 12/2007 | Murakami et al. | | 362/632 |
| 2008/0100775 A1 | 5/2008 | Hsiao | | |
| 2008/0144337 A1 * | 6/2008 | Li | | 362/633 |
| 2008/0291356 A1 * | 11/2008 | Kim | | 349/58 |
| 2009/0079902 A1 * | 3/2009 | Ogura | | 349/58 |
| 2010/0271845 A1 * | 10/2010 | Chiu et al. | | 362/633 |

FOREIGN PATENT DOCUMENTS

| | | |
|---|---|---|
| CN | 1461964 A | 12/2003 |
| CN | 1731246 A | 2/2006 |
| CN | 101000423 A | 7/2007 |
| CN | 101109862 A | 1/2008 |
| CN | 101295098 A | 10/2008 |
| CN | 101469844 A | 7/2009 |
| CN | 101634415 A | 1/2010 |
| CN | 201489240 U | 5/2010 |

* cited by examiner

*Primary Examiner* — Diane Lee
*Assistant Examiner* — Naomi M Wolford
(74) *Attorney, Agent, or Firm* — Cheng-Ju Chiang

(57) ABSTRACT

A backlight module and a backplate for use in the backlight module are disclosed. The backlight module comprises a light guide plate, a light source and a backplate; the backplate comprises a baseplate, side plates extending upwards from two opposite sides of the baseplate respectively, and top plates extending from the two side plates respectively and towards each other, and the side plates, the top plates and the baseplate together form recesses for receiving the light source, with two opposite edges of the light guide plate being disposed in the recesses; a fixing post is disposed at an end of the baseplate, and a fixing groove is formed in the light guide plate corresponding to the fixing post, with the fixing post being fitted in the fixing groove; and display panel positioning blocks are disposed at both ends of an upper surface of each of the top plates. Therefore, the backlight module of the present invention is compact in structure.

4 Claims, 6 Drawing Sheets

BACKLIGHT MODULE AND BACKPLATE OF THE BACKLIGHT MODULE

TECHNICAL FIELD

The present invention generally relates to the field of flat panel display, and more particularly, to a backlight module and a backplate of the backlight module.

BACKGROUND

A prior art backlight module generally comprises a backplate, a reflective sheet, a light guide plate, an optical film, a plastic frame and the like. During assembly, the reflective sheet, the light guide plate and the optical film are generally installed into the backplate at first, then the plastic frame is put thereon, and finally the parts including the light guide plate are fixed into the backplate by means of screws or other members.

Apart from the complex assembling process, the prior art backlight module described above also has the following disadvantages: it requires use of a large number of parts such as the plastic frame, which leads to a bulky volume and adds to the complexity in thermal conduction mechanism; moreover, moulds for fabricating these parts represent an additional cost.

As described above, although some structural designs have been made in the prior art to make the backlight module structure compact, these structural designs require use of a large number of parts and corresponding installing and fixing structures. Moreover, due to limitation imposed by the technological conditions, it is difficult to further reduce the weight and thickness of the backlight module and also difficult to further narrow side frames of the backlight module.

Additionally, the present inventor has noticed that, China Patent No. 200610157892.1 published on Jun. 25, 2008 disclosed a backlight module. This backlight module comprises a light guide plate having at least one light incident surface, a reflective sheet laminated on the light guide plate, at least one light source disposed adjacent to the light guide plate, and an assembling structure for the backlight module. The assembling structure for the backlight module comprises a frame and a backplate. The frame comprises two opposite sidewalls spaced apart and parallel with each other, with a connecting rail being formed therebetween. The backplate is horizontally inserted into the connecting rail to fixedly join with the frame and to form a receiving space for receiving the light guide plate, the reflective sheet and the at least one light source therein.

An objective of the China Patent No. 200610157892.1 is to ensure a smooth assembling process of the backlight module and simplify the detaching process by use of the detachable structure between the backplate and the frame. However, because of the complex structure of the sidewalls of the frame, it fails to solve the problem of further reducing the weight and thickness of the backlight module and further narrowing side frames of the backlight module.

SUMMARY OF THE INVENTION

A primary objective of the present invention is to provide a backlight module and a backplate for use in the backlight module, which can make the liquid crystal display (LCD) and the backlight module more compact in structure.

To achieve the aforesaid objective, the present invention provides a backlight module, comprising a light guide plate, a light source and a backplate, wherein: the backplate comprises a baseplate, side plates extending upwards from two opposite sides of the baseplate respectively, and top plates extending from the two side plates respectively and towards each other, and the side plates, the top plates and the baseplate together form recesses for receiving the light source therein, with two opposite edges of the light guide plate being disposed in the recesses; display panel positioning blocks are disposed at both ends of an upper surface of each of the top plates; a fixing plate extends outwards from each of two sides of the baseplate that are formed with the recesses, and a fixing hole is formed in the fixing plate.

In the backlight module, a fixing post is disposed at an end of the baseplate, and a fixing groove is formed in the light guide plate corresponding to the fixing post, with the fixing post being fitted in the fixing groove.

In the backlight module, a baffle is formed at an end of the baseplate, the two edges of the light guide plate are received in the recesses, and an end adjoining the two edges abuts against the baffle.

In the backlight module, an end of the baseplate is formed with a threaded hole, a positioning hole is formed in the light guide plate at a position corresponding to the threaded hole, and a bolt is inserted through the threaded hole into the positioning hole of the light guide plate.

To achieve the aforesaid objective, the present invention further provides a backlight module, comprising a light guide plate, a light source and a backplate, wherein: the backplate comprises a baseplate, side plates extending upwards from two opposite sides of the baseplate respectively, and top plates extending from the two side plates respectively and towards each other, and the side plates, the top plates and the baseplate together form recesses for receiving the light source therein, with two opposite edges of the light guide plate being disposed in the recesses.

In the backlight module, a fixing post is disposed at an end of the baseplate, and a fixing groove is formed in the light guide plate corresponding to the fixing post, with the fixing post being fitted in the fixing groove.

In the backlight module, a baffle is formed at an end of the baseplate, the two edges of the light guide plate are received in the recesses, and an end adjoining the two edges abuts against the baffle.

In the backlight module, display panel positioning blocks are disposed at both ends of an upper surface of each of the top plates.

In the backlight module, a fixing plate extends outwards from each of two sides of the baseplate that are formed with the recesses, and a fixing hole is formed in the fixing plate.

In the backlight module, an end of the baseplate is formed with a threaded hole, a positioning hole is formed in the light guide plate at a position corresponding to the threaded hole, and a bolt is inserted through the threaded hole into the positioning hole of the light guide plate.

To achieve the aforesaid objective, the present invention further provides a backplate for use in a backlight module, wherein: the baseplate comprises a baseplate, side plates extending upwards from two opposite sides of the baseplate respectively, and top plates extending from the two side plates respectively and towards each other, and the baseplate, the side plates and the top plates together form recesses.

In the backplate, the baseplate is formed with a positioning post or a baffle at an end thereof, and formed with a positioning hole at the other end thereof.

In the backplate, display panel positioning blocks are disposed at both ends of an upper surface of each of the top plates.

The present invention has the following benefits: as compared to the prior art backlight modules which have a complex structure, a bulky volume and a high cost, the present invention uses a backplate that serves the functions of both the plastic frame and the backplate; i.e., two opposite recesses are formed at two opposite sides of the backplate and the light guide plate is inserted into the recesses from a side so as to be fixed into the backplate. Because the present invention eliminates the need of other auxiliary frames, the thickness and width of the backlight module and the LCD can be significantly reduced to make them more compact.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF EMBODIMENTS

Reference will now be made to the drawings to describe preferred and exemplary embodiments of the present invention in detail.

Figure 1:
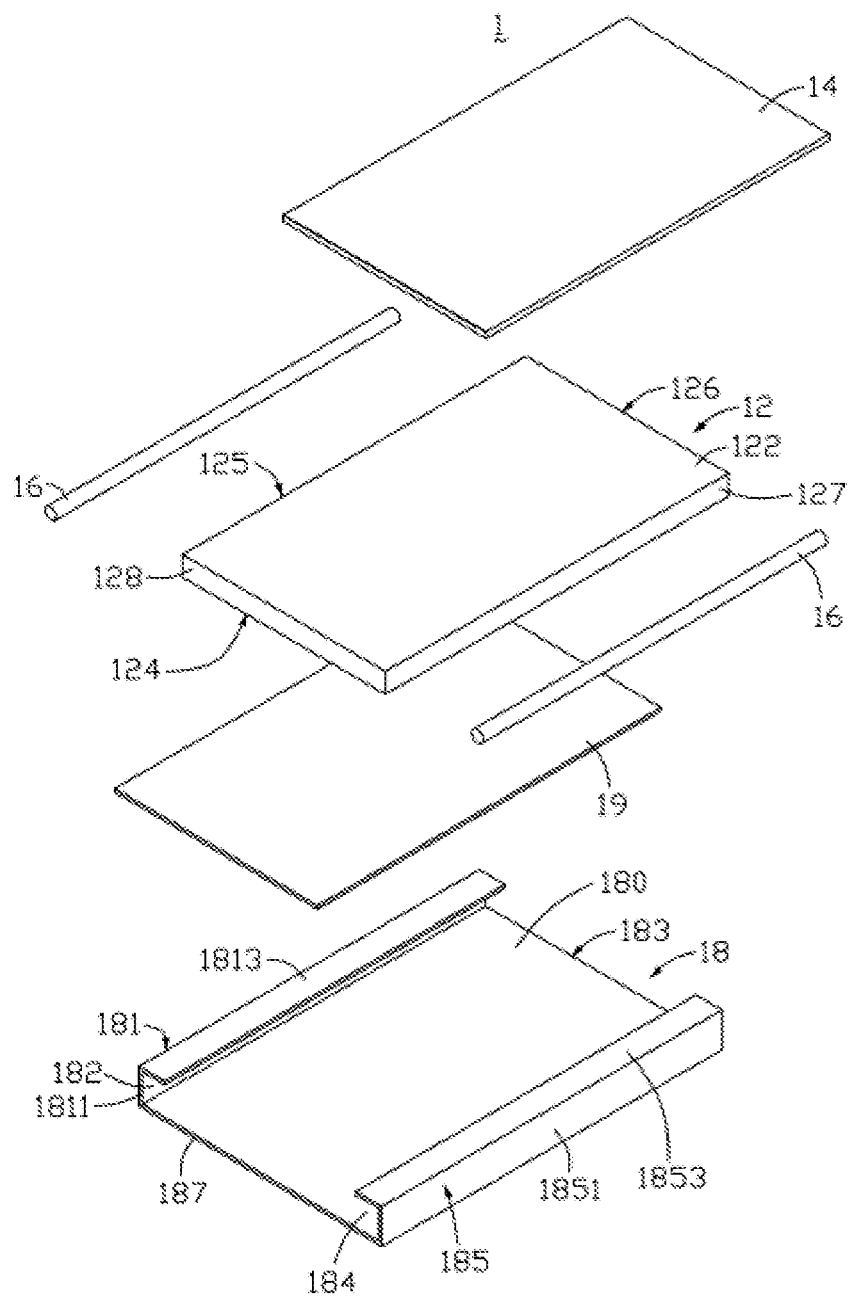
FIG. 1 is a schematic exploded view of a backlight module according to a first embodiment of the present invention.
Figure 2:
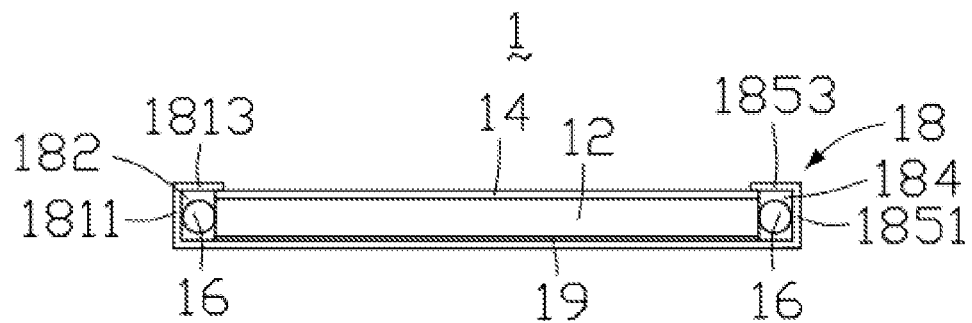
FIG. 2 is a schematic assembled view of the backlight module according to the first embodiment of the present invention.

Referring to FIG. 1 and FIG. 2, FIG. 1 is a schematic exploded view of a backlight module 1 according to a first embodiment of the present invention, and FIG. 2 is a schematic assembled view of the backlight module 1 according to the first embodiment of the present invention. The backlight module 1 comprises a light guide plate 12, an optical film 14, light sources 16 and a backplate 18.

The light guide plate 12 comprises a top surface 122 and a bottom surface 124 parallel with each other, and also comprises four side surfaces connecting the top surface 122 and the bottom surface 124 serially connected, namely, a first side surface 125, a second side surface 126, a third side surface 127 and a fourth side surface 128.

The optical film 14 is located above the top surface 122 of the light guide plate 12, and the light source 16 is located beside the first side surface 125 and the third side surface 127 of the light guide plate 12 respectively.

The backplate 18 comprises a baseplate 180, which has a first side 181, a second side 183, a third side 185 and a fourth side 187 serially connected. A first side plate 1811 and a third side plate 1851 extend upwards from the first side 181 and the third side 185 respectively. From upper ends of the first side plate 1811 and the third side plate 1851 respectively, a first top plate 1813 and a third top plate 1853 extend horizontally towards each other. The first top plate 1813, the first side plate 1811 and the baseplate 180 together form a first recess 182 for fixing an edge of the light guide plate 12, and the third top plate 1853, the third side plate 1851 and the baseplate 180 together form a third recess 184 for fixing an edge of the light guide plate 12.

There are two light sources 16 disposed inside the first recess 182 and the third recess 184 respectively. Of course, there may also be only one light source 16.

During assembly of the backlight module 1, the two light sources 16 are firstly inserted into the first recess 182 and the third recess 184 respectively, then the light guide plate 12 having the optical film 14 disposed on the top surface 122 thereof is inserted horizontally from the second side 183 or the fourth side 187 in such a way that the edges of the light guide plate 12 and the optical film 14 are embedded into the first recess 182 and the third recess 184 and fixed to the backplate 18. Here, the light sources 16 correspond to the first side 125 and the third side 127 of the light guide plate 12 respectively.

In this embodiment, a first reflective sheet 19 may also be disposed between the light guide plate 12 and the baseplate 180 of the backplate 18. The first reflective sheet 19 may be a reflective film adhered onto the bottom surface 124 of the light guide plate 12 or a reflective layer coated onto the baseplate 180 of the backplate 18.

In this embodiment, by disposing the first recess 182 and the third recess 184 at two opposite sides of the backplate 18, the light sources 16, the light guide plate 12 and the optical film 14 can be fixed to the backplate 18 by simply inserted them into the first recess 182 and the third recess 184. Because the light sources 16, the light guide plate 12 and the optical film 14 can be received and fixed by the first recess 182 and the third recess 184 of the backplate 18, use of other auxiliary fixing elements is eliminated to make the backlight module 1 more compact in structure.

Referring also to FIG. 1, the present invention further provides a backplate 18 for use in the backlight module. The backplate 18 comprises: a baseplate 180; side plates extending upwards from two opposite sides 181, 185 of the baseplate 180 respectively, which may be the first side plate 1811 and the third side plate 1851 respectively; and top plates extending from the two side plates and towards each other, which may be the first top plate 1813 and the third top plate 1853 respectively. The baseplate 180, the side plates and the top plates form recesses together, which may be the first recess 182 and the third recess 184.

Figure 3:
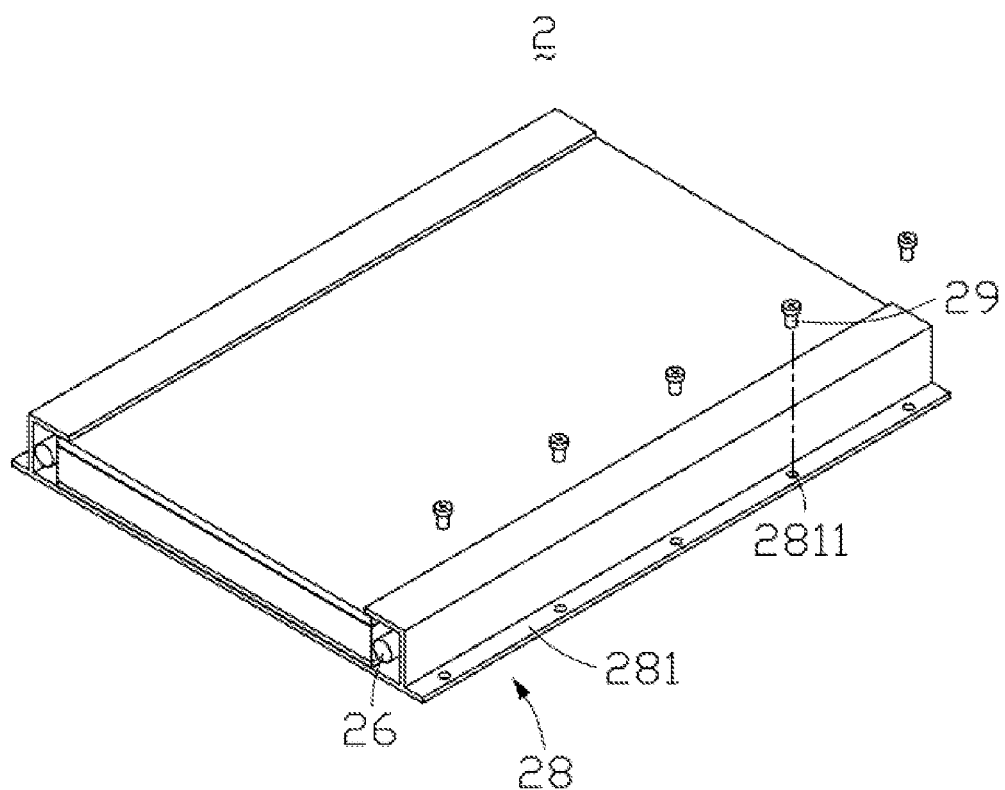
FIG. 3 is a schematic perspective view of a backlight module according to a second embodiment of the present invention.

Referring to FIG. 3, there is shown a schematic perspective view of a backlight module 2 according to a second embodiment of the present invention. A fixing plate 281 extends horizontally outwards from each of the sides of the backplate 28 where the first recess 282 and the third recess 284 are formed, and a plurality of fixing holes 2811 is formed on the fixing plate 281. Correspondingly, a front frame (not shown)

of the LCD and the backplate 28 can be fixed together by means of a plurality of screws 29 inserted through the fixing holes 2811.

Figure 4:
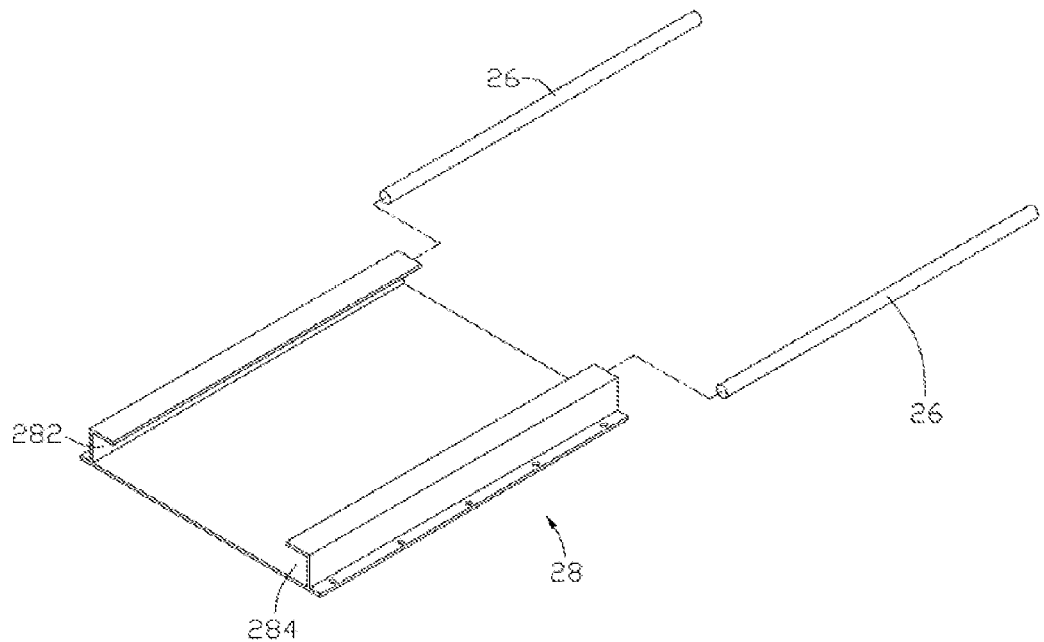
FIG. 4 is a schematic view illustrating assembly of a backplate and light sources of the backlight module according to the second embodiment of the present invention.

Referring to FIG. 4, there is shown a schematic view illustrating assembly of a backplate and light sources of the backlight module 2 according to the second embodiment of the present invention. Here, two light sources 26 are inserted into a first recess 282 and a third recess 284 respectively.

Figure 5:
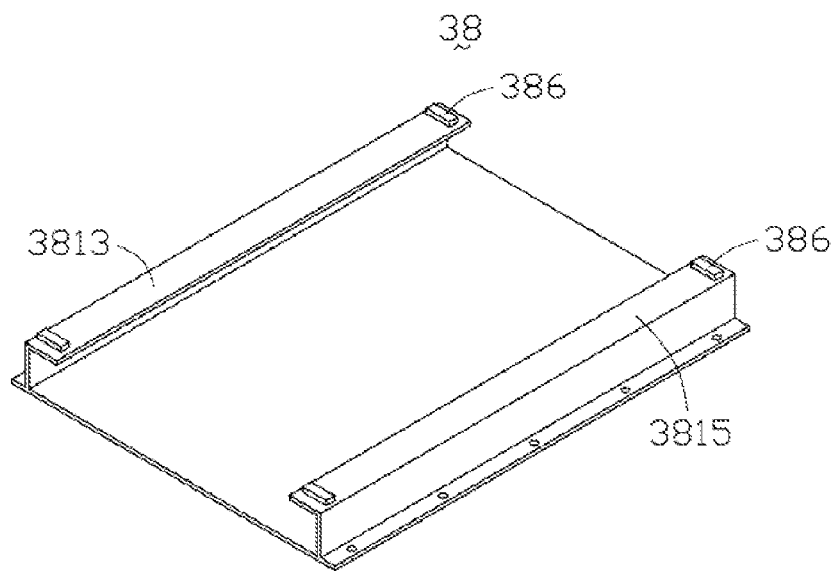
FIG. 5 is a schematic view of a backplate of a backlight module according to a third embodiment of the present invention.

Referring to FIG. 5, there is shown a schematic perspective view of a backplate 38 of a backlight module 3 according to a third embodiment of the present invention. The backplate 38 has a first top plate 3813 and a third top plate 3815, and at both ends of an upper surface of each of the first top plate 3813 and the third top plate 3815 are disposed display panel positioning blocks 386 for positioning a display panel (not shown) on the backplate 38.

Figure 6:
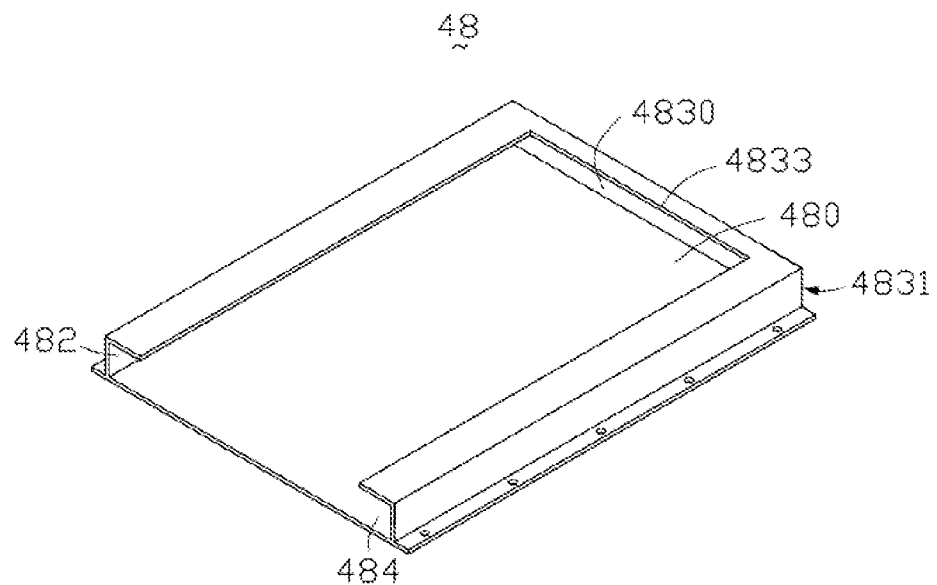
FIG. 6 is a schematic view of a backplate of a backlight module according to a fourth embodiment of the present invention.

Referring to FIG. 6, there is shown a schematic view of a backplate 48 of a backlight module 4 according to a fourth embodiment of the present invention. A second side plate 4831 extending upwards is disposed at the second side 483 of the baseplate 480, and a second top plate 4833 extending horizontally is disposed above the second side 483. The second top plate 4833, the second side plate 4831 and an upper surface of the baseplate 480 together form a second recess 4830 for fixing an edge of the light guide plate 42.

The second side plate 4831 may be termed as a baffle. Two edges of the light guide plate 42 are received in the first recess 482 and the second recess 484 disposed at both sides of the baseplate 480 respectively, with an end adjoining the two edges abutting against the second side plate 4831.

Figure 7:
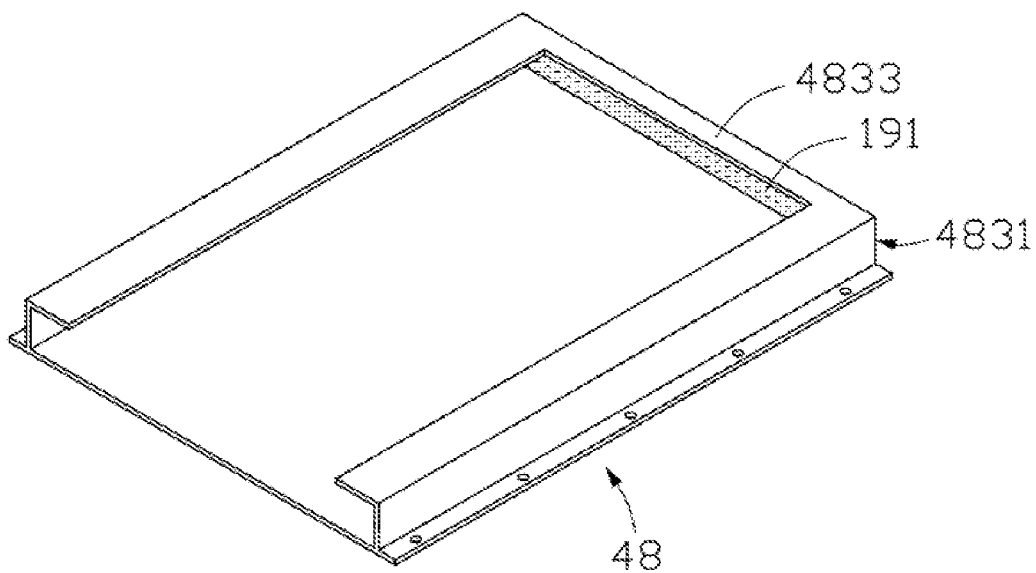
FIG. 7 is a schematic view illustrating assembly of a backplate and a second reflective sheet of the backlight module according to the fourth embodiment of the present invention.

Referring to FIG. 7, there is shown a schematic view illustrating assembly of a backplate 48 and a second reflective sheet 191 of the backlight module 4 according to the fourth embodiment of the present invention. A second reflective sheet 191 is disposed at the second side plate 4831. Of course, the first reflective sheet 19 and the second reflective sheet 191 may also be replaced by reflective films.

In this embodiment, by additionally providing the second side plate 4831, the second top plate 4833 and the second reflective sheet 191 disposed at the second side plate 4831, the light guide plate 42 can be effectively fixed and the utilization factor of light can be improved.

Figure 8:
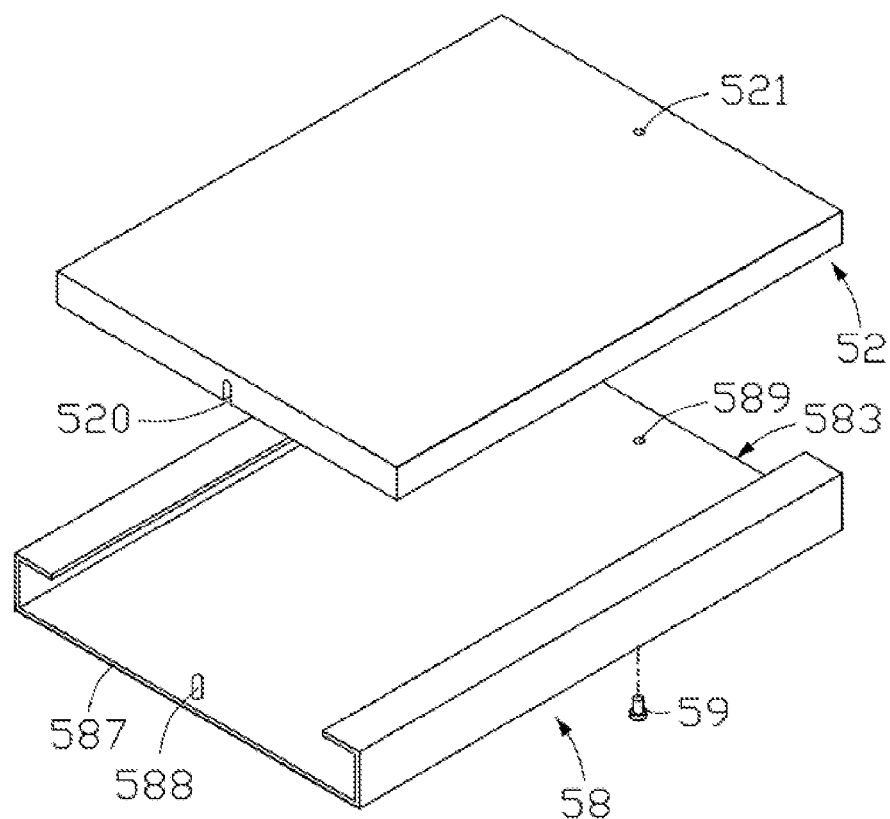
FIG. 8 is a schematic exploded view of a light guide plate and a backplate in a backlight module according to a fifth embodiment of the present invention.
Figure 9:
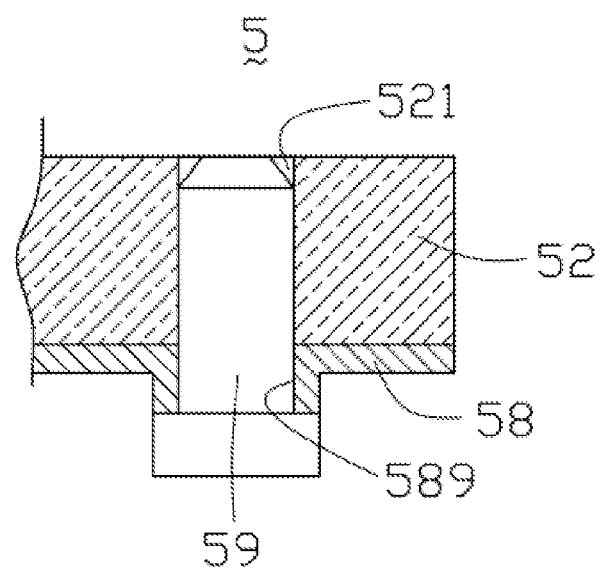
FIG. 9 is a schematic cross-sectional view of a movable fixing post in the backlight module according to the fifth embodiment of the present invention.

Referring to FIG. 8 and FIG. 9 together, FIG. 8 is a schematic exploded view of a backplate 58 and a light guide plate 52 according to a fifth embodiment of the present invention. The backplate 58 is provided with a fixing post 588 adjacent to a fourth side 587 thereof, and is formed with a threaded hole 589 adjacent to a second side 583 thereof. The light guide plate 52 is formed with a fixing groove 520 at a position corresponding to the fixing post 588, with the fixing post 588 being fitted in the fixing groove 520. The light guide plate 52 is formed with a positioning hole 521 corresponding to the threaded hole 589. A bolt 59 is inserted through the threaded hole 589 of the backplate 58 into the positioning hole 521 of the light guide plate 52 to fix the light guide plate 52 and the backplate 58 together. Of course, the fixing post 588 may also be replaced by other positioning blocks or baffles disposed on the backplate 58.

Figure 10:
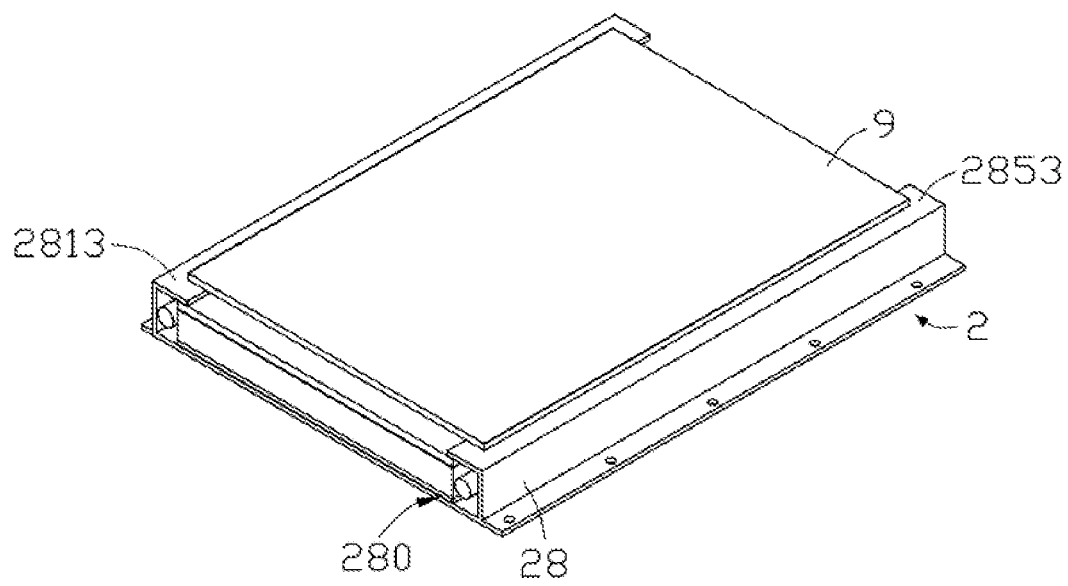
FIG. 10 is a schematic assembled view of a liquid crystal display (LCD) according to the present invention.

Referring to FIG. 10, there is shown a schematic assembled view of an LCD according to an embodiment of the present invention. The LCD of this embodiment comprises a display panel 9 and the backlight module 2 described above in the second embodiment. The display panel 9 and the baseplate 280 of the backplate 28 are disposed at two opposite sides of the light guide plate, and the display panel 9 is disposed above the first top plate 2813 and the third top plate 2853 of the backplate 28.

Of course, in this embodiment, the LCD is not merely limited to the combination of the display panel 9 and the backlight module 2 according to the second embodiment, but may also be a combination of the display panel 9 and a backlight module described above in any other embodiment.

As described above, because the backlight module is compact in structure, the LCD comprised of the backlight module and the display panel 9 is made to be more lightweight, thinner and more compact.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising a light guide plate, a light source and a backplate, wherein:
   the backplate comprises a baseplate, side plates extending upwards from two opposite sides of the baseplate respectively, and top plates extending from the two side plates respectively and towards each other, and the side plates, the top plates and the baseplate together form recesses for receiving the light source, with two opposite edges of the light guide plate being disposed in the recesses;
   a fixing post is disposed at one end of the baseplate, and a fixing groove is formed in the light guide plate corresponding to the fixing post, with the fixing post being fitted in the fixing groove; and
   a threaded hole is formed at the other end of the baseplate, and a positioning hole is formed in the light guide plate at a position corresponding to the threaded hole, and a bolt is inserted through the threaded hole into the positioning hole of the light guide plate.

2. The backlight module of claim 1, wherein: a baffle is formed at an end of the baseplate, the two edges of the light guide plate are received in the recesses, and an end adjoining the two edges abuts against the baffle.

3. The backlight module of claim 1, wherein:
   display panel positioning blocks are disposed at both ends of an upper surface of each of the top plates for positioning a display panel on the backplate;
   a fixing plate extends outwards from each of two sides of the baseplate that are formed with the recesses, and a plurality of fixing holes is formed on the fixing plate and a plurality of screws inserts through the fixing holes of the fixing plate respectively to fix together the display panel and the backplate.

4. The backlight module of claim 3, wherein: a length of the fixing plate is approximately the same as that of the side plate.

* * * * *